(12) United States Patent
Zhu

(10) Patent No.: US 10,090,007 B2
(45) Date of Patent: Oct. 2, 2018

(54) DUAL-SIDE SPIN TRANSFER SPIN TORQUE OSCILLATOR

(71) Applicant: Carnegie Mellon University, Pittsburgh, PA (US)

(72) Inventor: Jian-Gang Zhu, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 0 days.

(21) Appl. No.: 15/006,972

(22) Filed: Jan. 26, 2016

(65) Prior Publication Data

US 2016/0218728 A1 Jul. 28, 2016

Related U.S. Application Data

(60) Provisional application No. 62/125,616, filed on Jan. 26, 2015, provisional application No. 62/178,361, filed on Apr. 8, 2015.

(51) Int. Cl.
*G11B 5/235* (2006.01)
*G11B 5/31* (2006.01)
*G11B 5/127* (2006.01)
*G11B 5/00* (2006.01)

(52) U.S. Cl.
CPC .......... *G11B 5/3146* (2013.01); *G11B 5/1278* (2013.01); *G11B 5/235* (2013.01); *G11B 5/314* (2013.01); *G11B 2005/0024* (2013.01)

(58) Field of Classification Search
None
See application file for complete search history.

(56) References Cited

U.S. PATENT DOCUMENTS

| 7,616,412 | B2 | 11/2009 | Zhu et al. | |
| 9,064,508 | B1* | 6/2015 | Shiimoto et al. | G11B 5/3146 |
| 2007/0086121 | A1* | 4/2007 | Nagase et al. | B82Y 25/00 |
| | | | | 360/324.1 |
| 2009/0080106 | A1* | 3/2009 | Shimizu et al. | G11B 5/314 |
| | | | | 360/125.03 |
| 2013/0050869 | A1* | 2/2013 | Nagasaka et al. | G11B 5/3146 |
| | | | | 360/125.01 |
| 2014/0133048 | A1* | 5/2014 | Shiimoto et al. | G11B 5/314 |
| | | | | 360/125.12 |

OTHER PUBLICATIONS

J.-G. Zhu et al., "Microwave Assisted Magnetic Recording," IEEE Trans. Magn. vol. 44:125-131 (2008).
J.-G. Zhu et al., Microwave Assisted Magnetic Recording Utilizing Perpendicular Spin Torque Oscillator with Switchable Perpendicular Electodes, IEEE Trans. Magn. 46:751-757 (2010).
X. Zhu et al., "Bias-Field-Free Microwave Oscillator Driven by Perpendicularly Polarized Spin Current," IEEE Trans. Magn. vol. 42:2670 (2006).

\* cited by examiner

*Primary Examiner* — Craig A. Renner
(74) *Attorney, Agent, or Firm* — Fish & Richardson P.C.

(57) ABSTRACT

An oscillation mechanism comprises a first spin-polarization layer having a first magnetic moment; a second spin-polarization layer having a second magnetic moment, wherein an orientation of the second magnetic moment is configured to oppose an orientation of the first magnetic moment; and a field-generating layer disposed between the first spin-polarization layer and the second spin-polarization layer for generating a magnetic field that oscillates around one or more of the first and second magnetic moment orientations.

26 Claims, 17 Drawing Sheets

DUAL-SIDE SPIN TRANSFER SPIN TORQUE OSCILLATOR

CLAIM OF PRIORITY

This application claims the benefit of priority under 35 U.S.C. § 119(e) to provisional U.S. patent application Ser. No. 62/125,616 filed on Jan. 26, 2015 and provisional U.S. patent application Ser. No. 62/178,361 filed on Apr. 8, 2015, the entire contents of each of which are hereby incorporated by reference.

BACKGROUND

The device relates to microwave-assisted magnetic recording for data storage. More specifically the device relates to spin torque oscillators used to generate high-frequency magnetic fields for microwave-assisted magnetic recording.

Perpendicular spin torque oscillators have been used to generate AC magnetic fields at microwave frequencies in thin film magnetic recording media to assist magnetic recording process. A conventional spin torque oscillator typically consists of one polarization layer for spin polarizing the injected electron current (polarizing in terms of spin orientation), yielding a spin transfer torque within the oscillating layer (also called field-generating layer).

SUMMARY

An oscillation mechanism described herein includes a dual-side spin transfer perpendicular spin torque oscillator. In the oscillation mechanism, two spin polarization layers with opposite magnetization orientations are placed on two sides of the oscillating layer (also referred to as a magnetization precession layer or a field-generating layer) so that spin transfer torque effect within the oscillating layer is significantly enhanced. To realize the opposite magnetization orientation configuration for the two spin polarization layers, one of the spin polarization layers is antiparallel magnetically coupled with an additional magnetic layer of greater magnetic moment.

The oscillation mechanism includes a first spin-polarization layer having a first magnetic moment; a second spin-polarization layer having a second magnetic moment, wherein an orientation of the second magnetic moment is configured to oppose an orientation of the first magnetic moment; and a field-generating layer disposed between the first spin-polarization layer and the second spin-polarization layer for generating a magnetic field that oscillates around one or more of the first and second magnetic moment orientations.

The oscillation mechanism can include a field-guide layer and a metal layer disposed between the second spin-polarization layer and the field-guide layer, wherein the metal layer and the second-spin polarization layer are magnetically coupled such that the orientation of the second magnetic moment opposes a third magnetic moment of the field-guide layer. A magnitude of the third magnetic moment is greater than a magnitude of the second magnetic moment. The field-guide layer and the metal layer each have magnetic anisotropy approximately normal to a plane of that layer. The oscillation mechanism includes an electric contact. The first spin-polarization layer, the second spin-polarization layer and the field-generating layer form a stack, and wherein an electric contact is on each end of the stack. The electric contact comprises a metallic material. The field-generating layer is configured to generate the magnetic field when a stack comprising the first spin-polarization layer, the second spin-polarization layer and the field-generating layer is biased with a current. The field-generating layer generates the magnetic field when the stack is biased with a voltage. A first non-magnetic interlayer is disposed between the field-generating layer and the first spin-polarization layer. A second non-magnetic interlayer is disposed between the field-generating layer and the second spin-polarization layer. Oscillation mechanism is formed by a lithographic patterning technique. The oscillation mechanism includes one or more seed layers for generating one or more magnetic layers with one or more crystalline orientations. The oscillation mechanism includes one or more underlayers. The oscillation mechanism can include one or more seed layers for generating one or more magnetic layers with a predefined texture. The oscillation mechanism can include a first magnetic anisotropy layer having an axis being approximately orthogonal to a plane of the first magnetic anisotropy layer, wherein the first magnetic anisotropy layer is contacting the first spin-polarization layer. The first magnetic anisotropy layer is attached to the first spin-polarization layer. The oscillation mechanism can include a second magnetic anisotropy layer having an axis being approximately orthogonal to a plane of the second magnetic anisotropy layer and in the same direction as the axis of the first anisotropy layer, wherein the second magnetic anisotropy layer is contacting the field-guide layer. The second magnetic anisotropy layer is attached to the field-guide layer. The metal layer is less than 5 nanometers thick. Each of the first and second non-magnetic interlayers comprises one or more elements configured to cause a conduction spin to rotate. The field-generating layer has a width greater than 8 nanometers.

Some implementations of the oscillation mechanism include a write pole; a trailing shield; a write gap between the write pole and the trailing shield; an oscillation mechanism in the write gap, the oscillation mechanism having a number of layers forming a stack, the stack comprising: a first spin-polarization layer having a first magnetic moment; a second spin-polarization layer having a second magnetic moment, wherein an orientation of the second magnetic moment opposes an orientation of the first magnetic moment; and a field-generating layer disposed between the first spin-polarization layer and the second spin-polarization layer for generating a magnetic field which oscillates around one or more of the first and second magnetic moment orientations.

The oscillation mechanism can include a field-guide layer; and a metal layer disposed between the second spin-polarization layer and the field-guide layer, wherein the magnetic layer and the second-spin polarization layer are magnetically coupled such that the orientation of the second magnetic moment opposes a third magnetic moment of the field-guide layer. The distance between a center of the field-generating layer and a trailing edge of the write pole is within a range of approximately 5-20 nanometers.

DETAILED DESCRIPTION

This disclosure describes an oscillation mechanism such as dual-side spin transfer perpendicular spin torque oscillator. The device has two spin polarization layers that are placed on each side of the oscillating layer (field-generating layer) so that the spin transfer torque effect in the oscillating layer is significantly enhanced. An element included in more than one figure has the same numerical reference in each figure in which the element has a numerical reference.

Figure 1:
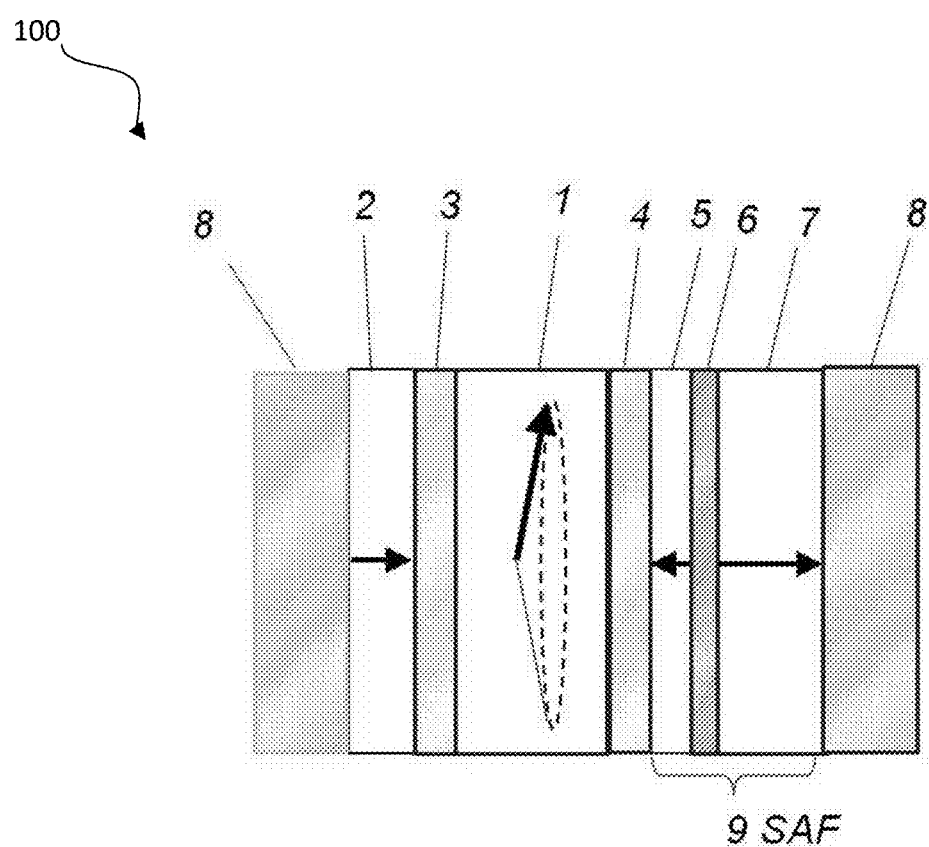
FIG. 1 shows an example schematic of an oscillation mechanism.

Referring to FIG. 1, diagram 100 shows a schematic of dual-side spin transfer perpendicular spin torque oscillator (DSST-PSTO) design of the oscillation mechanism. The PSTO film stack comprises a field-generating layer 1 that is also referred to as a magnetization precession layer or a magnetic oscillating layer. The PSTO film stack has two spin polarization layers 2, 5 such that one is on each side of the field-generating layer 1. A magnetization of a spin-polarization layer 2 is configured to be approximately oriented in the direction opposite to a magnetization of the spin polarization layer 5. The spin polarization layer 2 is separated from the field-generating layer 1 by an interlayer 3. The spin polarization layer 5 is separated from the field-generating layer 1 by an interlayer 4. In some examples, the interlayer 3 and the interlayer 4 are non-magnetic metal layers. In some examples, the interlayer 3 and the interlayer 4 are tunnel barrier layers. The thickness of each of the interlayers, including each of the interlayer 3 and the interlayer 4, is thinner than that of the spin diffusion length within each of the interlayers 3, 4 such that when electrons pass through each interlayer, spin orientations of the electrons are maintained.

In order to keep the magnetization of the spin polarization layer 5 to be approximately in the opposite direction of that of the spin polarization layer 2, the spin polarization layer 5 is a part of a tri-layer structure. The spin polarization layer 5 is adjacent to a thin metal layer 6 that is adjacent to another magnetic layer called a field-guide layer 7 (e.g., a field-flux-guide layer). In the tri-layer, comprising the spin polarization layer 5, the thin metal layer 6, and the field-guide layer 7, there exists a significant antiparallel magnetic coupling between the magnetization of the spin polarization layer 5 and the field-guide layer 7 such that the magnetic moment orientations of the spin polarization layer 5 and the magnetic layer 7 are approximately antiparallel to each other during operation. The magnetic moment of the field-guide layer 7 is usually greater in magnitude than that of the spin polarization layer 5. The spin polarization layer 5, the metal layer 6 and the field-guide layer 7 thus form an antiparallel coupled magnetic tri-layer 9 or SAF (synthetic anti-ferromagnet), further described below.

The DSST-PSTO is a two-terminal electric device. Electric contacts are usually placed at the end of the PSTO stack as the two layers 8 shown in FIG. 1.

Figure 2A:
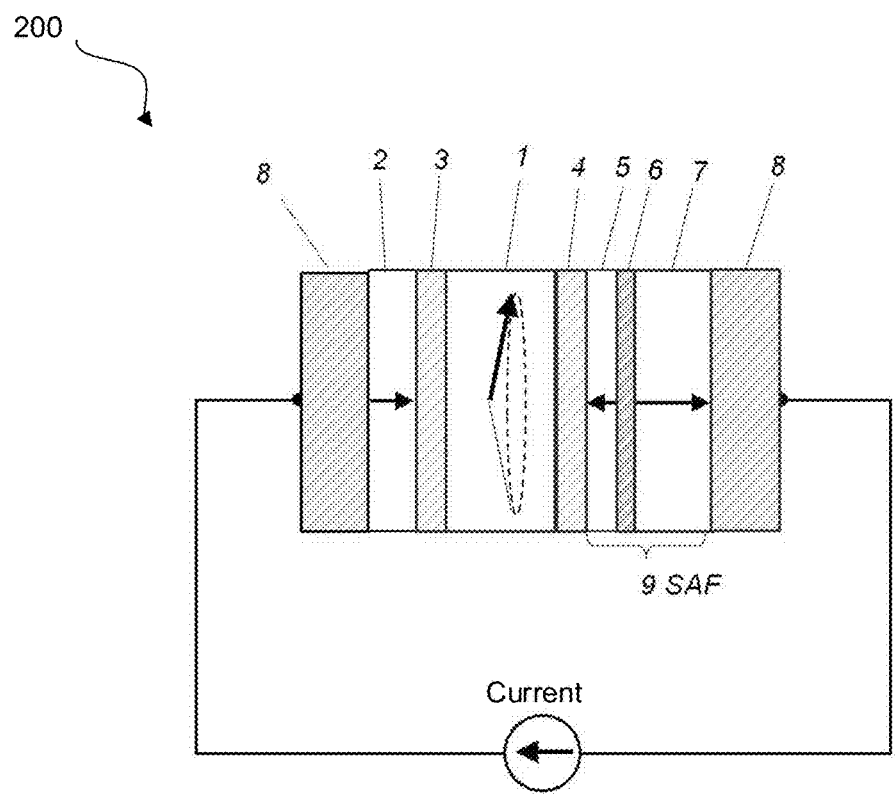
FIG. 2A shows an example schematic of the oscillation mechanism biased by a current source.
Figure 2B:
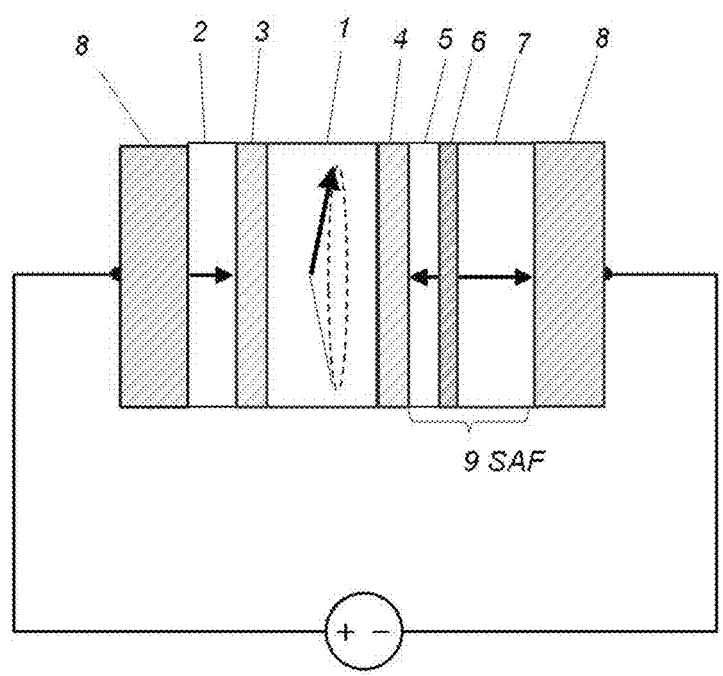
FIG. 2B shows an example schematic of the oscillation mechanism biased by a voltage source.

Referring to diagram 200 in FIG. 2A, in the dual-side spin transfer perpendicular spin torque oscillator design, if an electric current is injected such that the current flow is from left to right for the PSTO, the corresponding electron flow is from right to left. Similarly, a current can be generated by applying a voltage to the oscillation mechanism as shown in diagram 210 in FIG. 2B. A current source or voltage source is affixed to the electric contacts 8 to provide the electric current to the oscillation mechanism. The magnetization of the spin polarization layer 2 is oriented towards the direction of current flow and so is the magnetization of the field-guide layer 7 since its magnetic moment is greater than that of the spin polarization layer 5. The thin metal layer 6 is sandwiched between the spin polarization layer 5 and the field-guide layer 7 such that the antiparallel coupled tri-layer is formed. The sufficiently strong antiparallel coupling between the magnetizations of the spin polarization layer 5 and the field-guide layer 7 within the antiparallel tri-layer ensures that the magnetization of the spin polarization layer 5 is antiparallel to the current direction and opposite to the magnetization direction of the spin polarization layer 2. As the electron current passes through the spin polarization layer 5, the electron current becomes spin-polarized with a spin polarization direction parallel to the magnetization of the spin polarization layer 5. As the spin-polarized electron current enters the field-generating layer 1, a spin transfer between the polarized spin current and the local magnetization occurs. Since the spin polarization in the electron current is moving away from the interface with the interlayer 4 towards the interior of field-generating layer 1, the spin polarization in the electron current gradually decreases and so does the spin transfer effect. The antiparallel coupled tri-layer enhances the spin transfer effect from the spin polarization layer 5. Near the other side of the field-generating layer 1, close to the interface of the interlayer 3, the electron current becomes more spin-polarized again with the same spin polarization orientation due to the fact that the magnetization of the spin polarization layer 2 is approximately opposite of that of the spin polarization layer 5.

Figure 3:
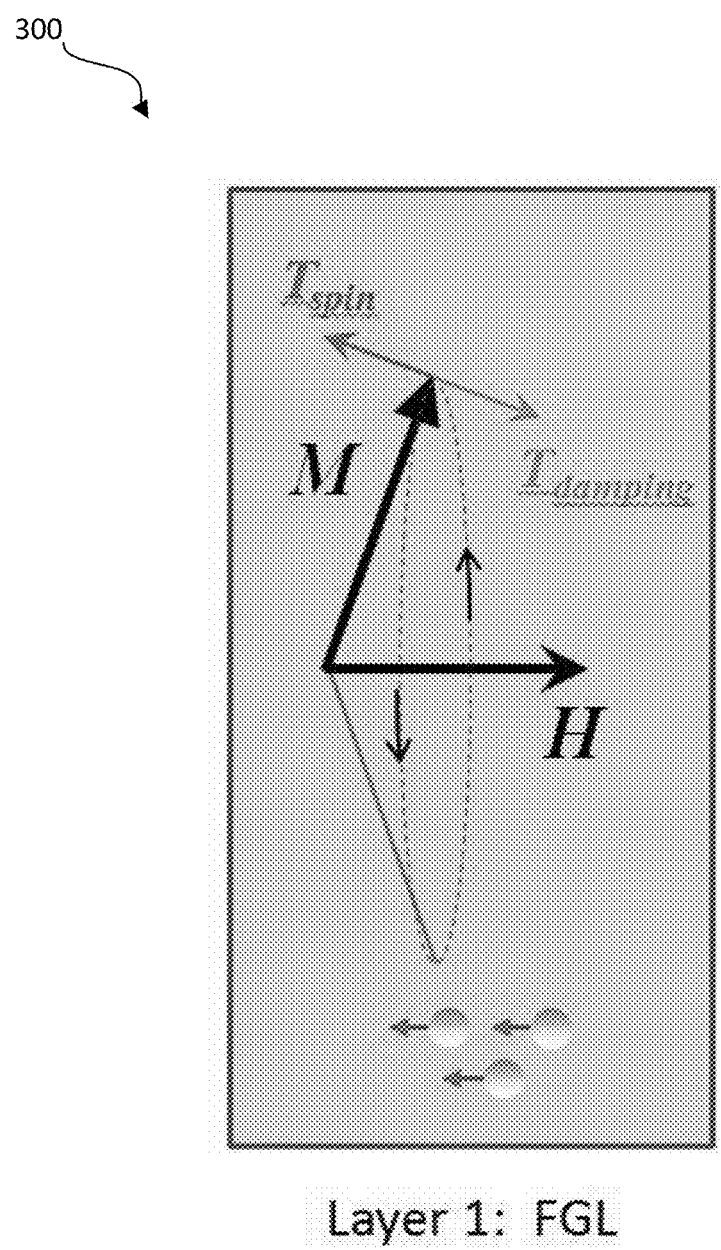
FIG. 3 shows an example of a field-generating layer.

Referring to FIG. 3, diagram 300 shows an illustration of the operation of the field-generating layer 1. In the presence of a sufficiently large magnetic field applied perpendicular to the film plane such that the magnetization of the field-generating layer 1 is caused to orient out of the film plane, a sufficient spin-polarized electron current density with spin polarization antiparallel to the field direction will yield a spin torque on the local magnetization to pull it away from the field direction, creating a non-equilibrium situation. The magnetization, being an angular momentum, will naturally oscillate (e.g., precess or rotate) around the magnetic field at a frequency equal to $(\gamma/2\pi)H$, where H is the magnitude of the field in the oscillating layer. $T_{spin}$ represents a spin torque generated by polarized spin current. $T_{damping}$ represents a damping torque that balances the spin torque and that results from the applied field. M represents the magnetization of the field-generating layer 1. M, $T_{spin}$, and $T_{damping}$ are described in greater detail below in relation to FIG. 13.

Figure 4A:
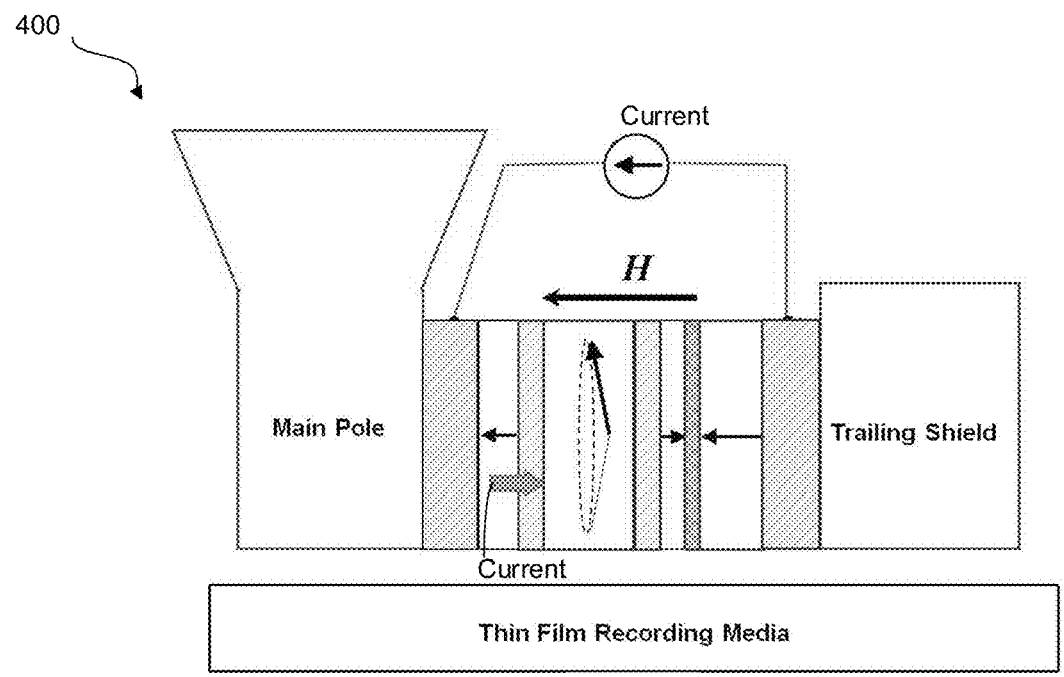
FIG. 4A and FIG. 4B show examples of an oscillation mechanism in a recording head.

Referring to FIG. 4A, diagram 400 shows an example application for the oscillation mechanism. An important application of this novel design with enhanced spin transfer effect is for use in microwave assisted magnetic recording (MAMR), a potential technology candidate for future hard disk drives (HDD). In MAMR application, the entire PSTO is placed inside the gap between the main write pole and the trailing shield as shown in FIG. 4A. As described above, the mechanism can be biased either by a current source or a voltage source. At a sufficiently high current amplitude, the magnetization of the field-generating layer 1 will oscillate. The spin transfer torque facilitated magnetization precession in the field-generating layer 1 is utilized to generate AC magnetic field in the media. There is a strong magnetic field within the gap when the recording head is energized by a write current. The magnetization of the spin polarization layer 2 orients itself towards the field direction and so does the magnetization of the field-guide layer 7 since its magnetic moment is greater than that of the spin polarization layer 5. The sufficiently strong antiparallel coupling between the magnetizations of the spin polarization layer 5 and the field-guide layer 7 within the antiparallel tri-layer ensures that the magnetization of the spin polarization layer 5 is antiparallel to the field direction and opposite to the magnetization direction of the spin polarization layer 2. Such a magnetization configuration of the layers ensures a constructive enhancement of spin transfer effect inside the field-generating layer 1. The antiparallel coupled tri-layer, comprising the spin polarization layer 5, the thin metal layer 6, and the field-guide layer 7, facilitates the enhanced spin transfer inside the field-generating layer 1 having the same spin polarization of the electron current near the interfaces with the interlayers 3, 4 at both sides.

Figure 4B:
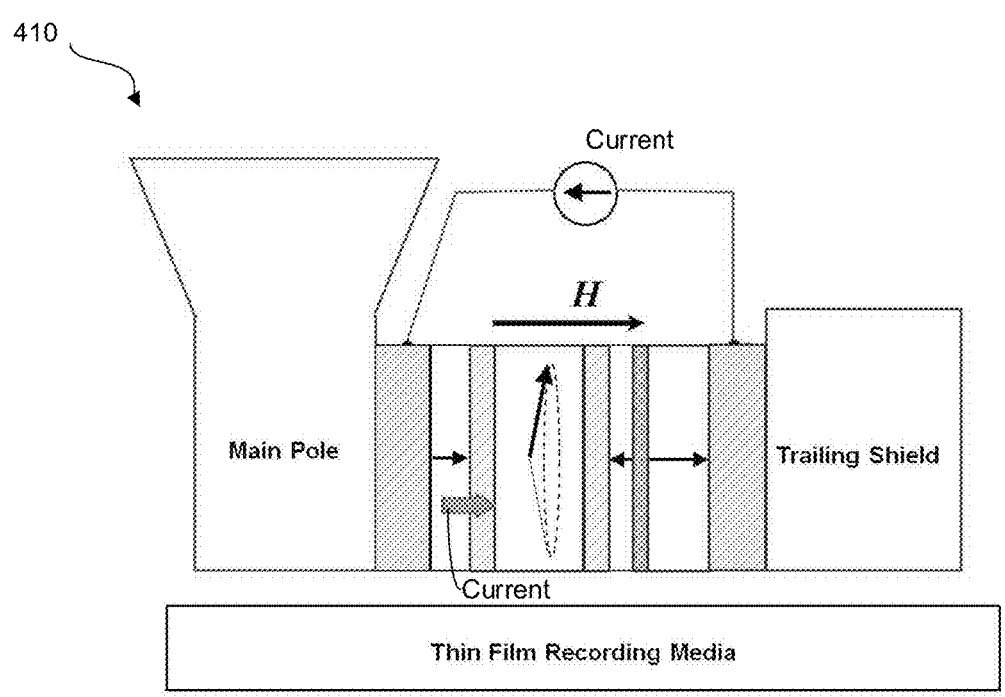

As shown in diagram 410 in FIG. 4B, when the write current of the recording head is reversed, the magnetic field direction inside the gap between the main pole and trailing shield also reverses. The magnetization components of all the magnetic layers reverse following the reversal of the field in the gap. The magnetic moments of all the layers in the PSTO stack also reverse. The precessional chirality of the field-generating layer 1 also reverses accordingly.

The position of the field-generating layer 1 relative to the closer surface (perpendicular to an air-bearing-surface) of the main pole is important for producing optimal recording performance. The distance between the center of the field-generating layer 1 and the trailing edge of the main write pole can be approximately 5 nm to 20 nm, depending on the write head design.

Figure 5A:
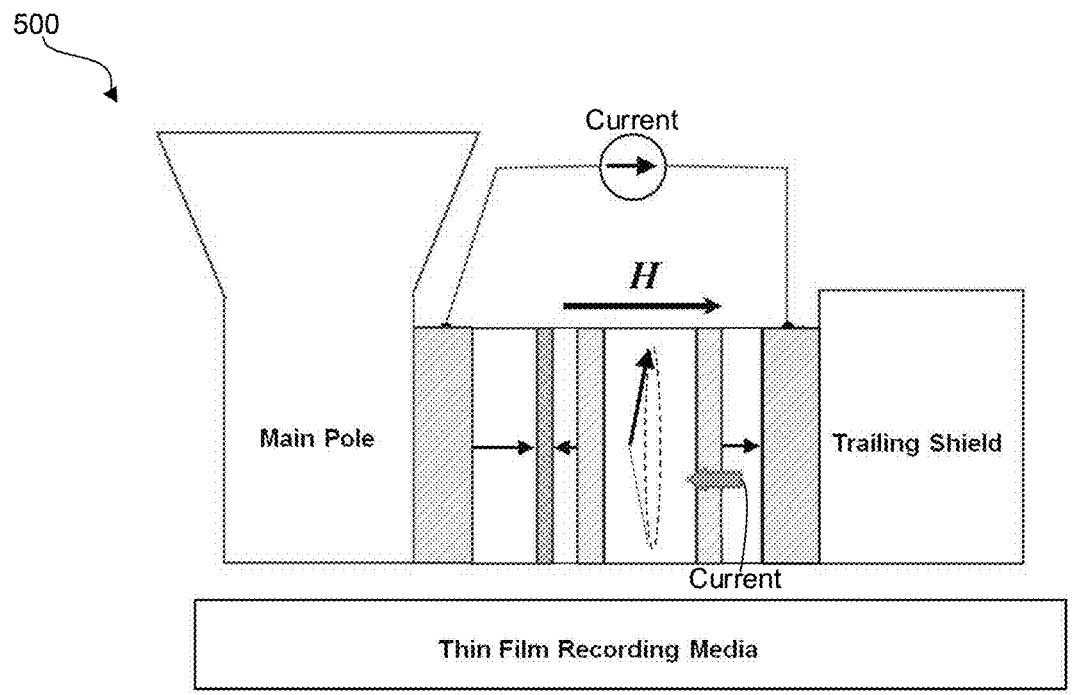
FIG. 5A and FIG. 5B show examples of an oscillation mechanism in a recording head.
Figure 5B:
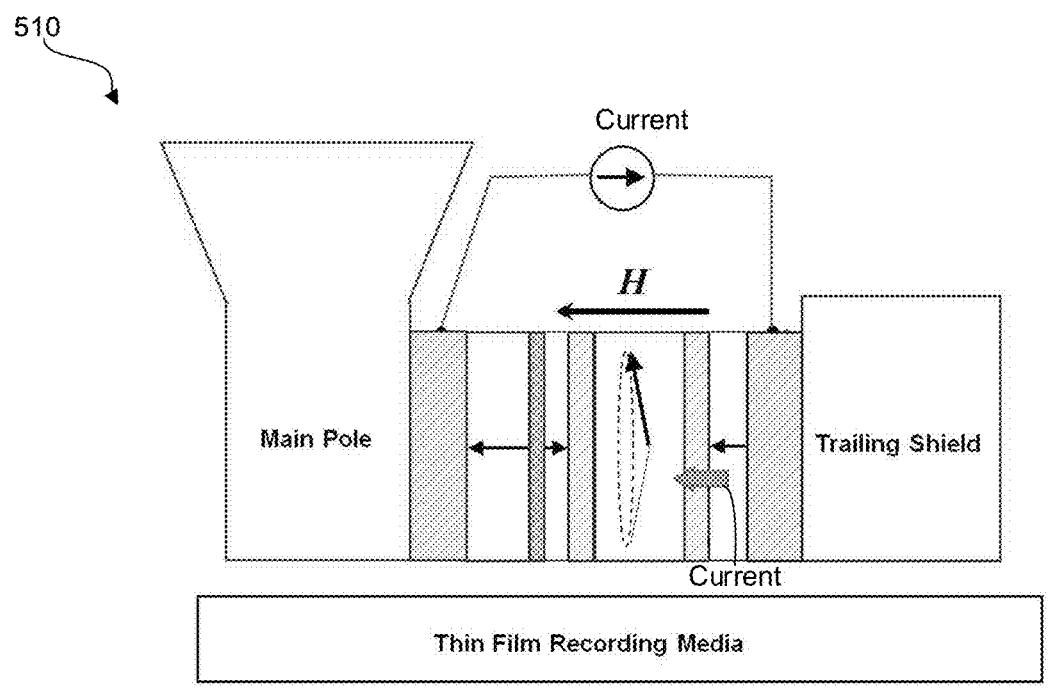

The PSTO stack can also be physically flipped within the gap, as shown in diagram 500 in FIG. 5A and diagram 510 in FIG. 5B. The DC injecting current direction is in a direction such that the resulting spin transfer toque generated on the magnetization of the field-generating layer 1 pulls the magnetization away from the direction of the magnetic field inside the gap.

Since the field-generating layer 1 serves the purpose of generating AC magnetic field in the magnetic medium below the PSTO, it is more preferred to have the magnetization of the field-generating layer 1 precessing completely within the film plane. In order to pull the magnetization of the field-generating layer 1 completely within the film plane, a sufficiently high spin torque is required. The dual-side spin transfer spin torque oscillator design of the oscillation mechanism can significantly reduce the needed injecting current magnitude for generating the desired magnetic precession and causing the magnetization of the field-generating layer 1 to oscillate (e.g., precess or rotate) within the film plane.

Figure 6A:
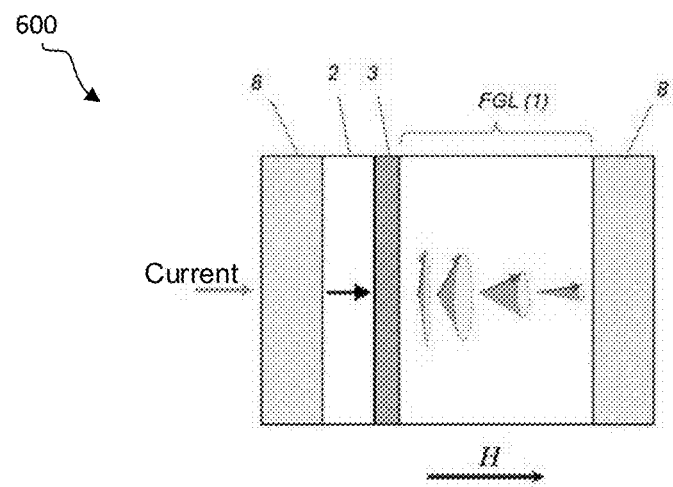
FIG. 6A shows an illustration of an effect of single side spin transfer results from a single polarization layer.
Figure 6B:
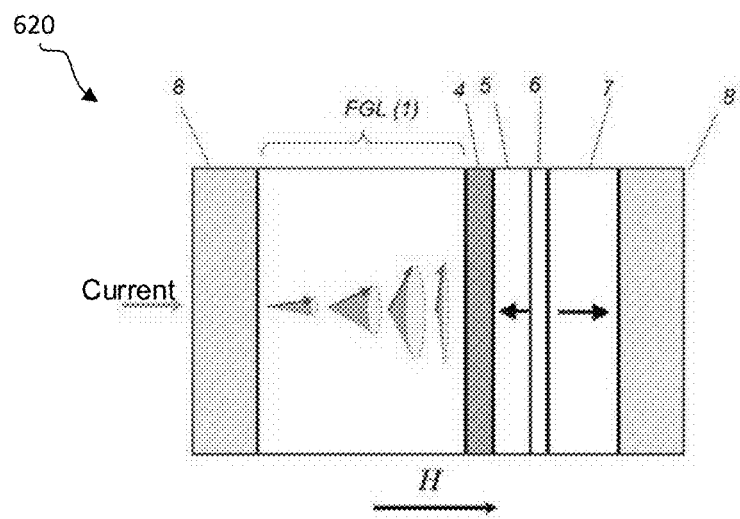
FIG. 6B shows an illustration of an effect of single side spin transfer results from a single polarization layer which is a part of an antiparallel magnetically coupled tri-layer.
Figure 6C:
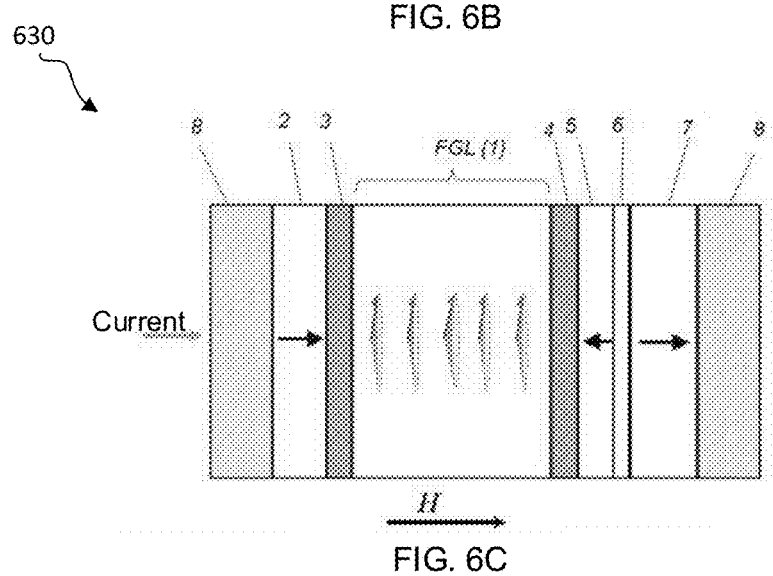
FIG. 6C shows an illustration of an effect of dual-side spin transfer.

FIGS. 6A-6C illustrate example effects of a dual-side spin transfer spin torque oscillator design for the oscillation mechanism. The dual-side spin transfer spin torque oscillator design is important when the field-generating layer 1 needs to be relatively thick (>8 nm) to generate a sufficient AC magnetic field. A spin diffusion length in a ferromagnetic layer is usually 1 nm to 2 nm. As shown in diagram 600 in FIG. 6A, the spin transfer effect occurs within the spin diffusion length, inside the field-generating layer 1, away from the interface with the interlayer 3. Since the preferred field-generating layer 1 thickness in the MAMR application can be approximately 5 nm to 25 nm, the magnetization orientation within the field-generating layer 1 can be quite non-uniform through the depth of the film since the exchange length in a typical field-generating layer 1 is typically smaller than 10 nm. Thus the magnetization of the field-generating layer 1 on the opposite side of where the spin transfer effect is taken place would remain unaffected. As shown in diagram 620 in FIG. 6B, such an effect occurs for either spin polarization layer 2, 5. However, as shown in diagram 630 in FIG. 6C, using the dual-side spin transfer effect, a spin transfer effect takes place near both interfaces with the interlayers 3, 4 within the field-generating layer 1 and the spin torque can be effectively enhanced. The magnetization within the field-generating layer 1 can approximately uniform even when the field-generating layer 1 is relatively thick.

Figure 7:
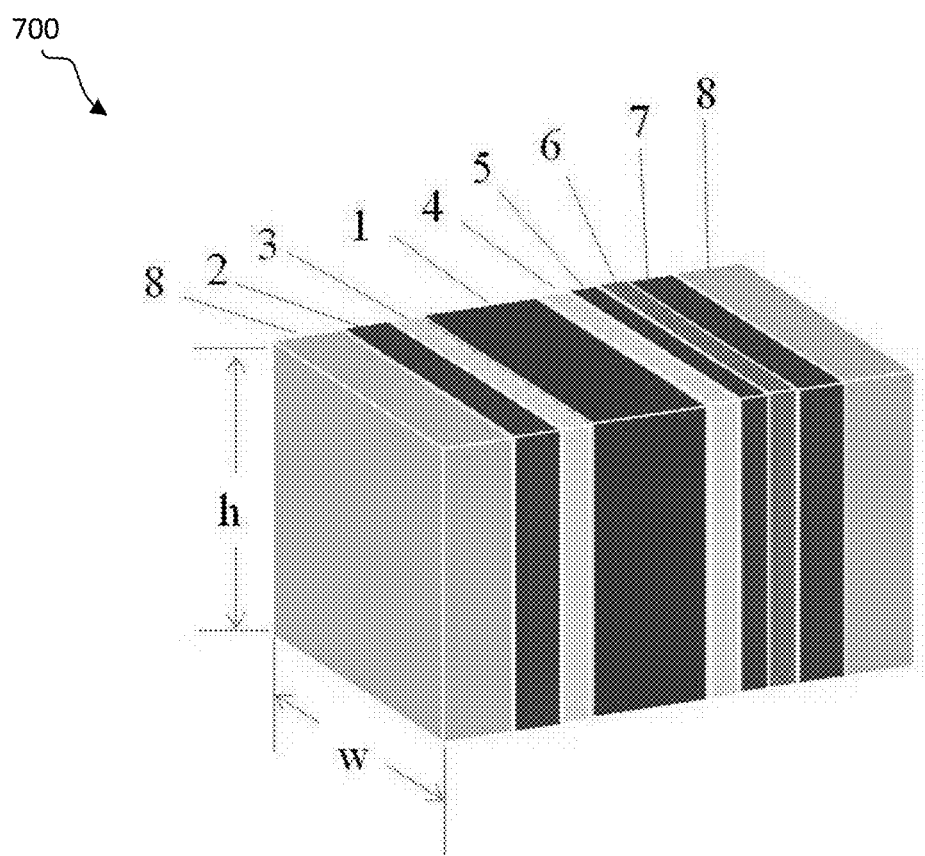
FIG. 7 shows a perspective view of the oscillation mechanism.

The PSTO can be fabricated using a lithographic patterning technique. A perspective schematic illustration of a patterned stack is shown in diagram 700 in FIG. 7. A width w of a patterned device is usually in the range between 5 nm and 500 nm. A height h of a patterned device is usually in the range between 5 nm and 1000 nm. In the application of MAMR, the width can be the written track width, which is approximately 30 nm in today's hard disk drive products.

Figure 8:
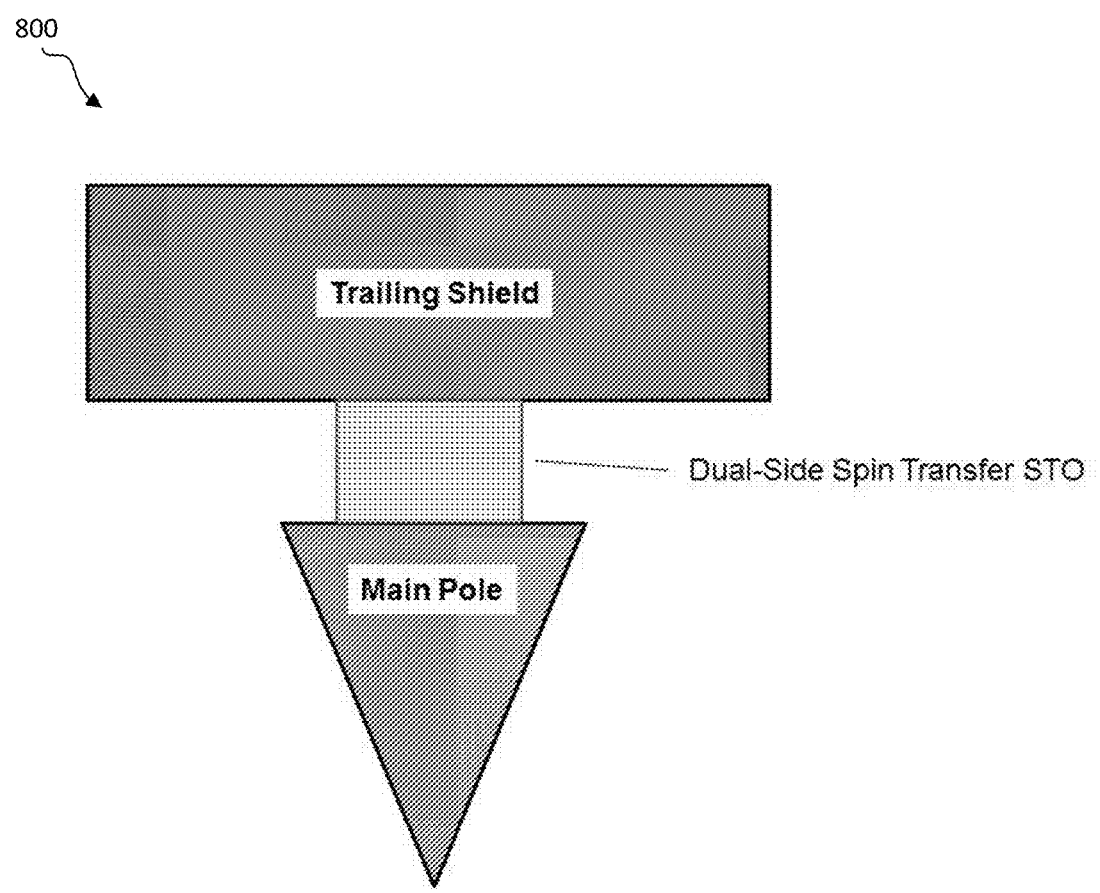
FIG. 8 shows the air-bearing surface (ABS) view of the embedded oscillation mechanism.

Referring to FIG. 8, diagram 800 shows the air-bearing surface (ABS) view of the embedded dual-side spin transfer spin torque oscillator. The width of the spin torque oscillator in the cross-track direction can be either wider or narrower than the width (in the cross-track direction) of the main write pole. Its position in the cross-track direction can also be shifted with respect to the main write pole and does not have to be centered.

In some implementations of the oscillation mechanism, the stack could further comprise seed layers and one or more underlayers for creating magnetic layers with proper texture and crystalline orientations. Diagrams 900 and 910 in FIGS. 9A and 9B, respectively each show an example of a practical realization of the film stack of the dual-side spin transfer spin torque oscillator. Other film stack combinations and permutations are possible, such as additional seed layers and underlayers.

Figure 9A:
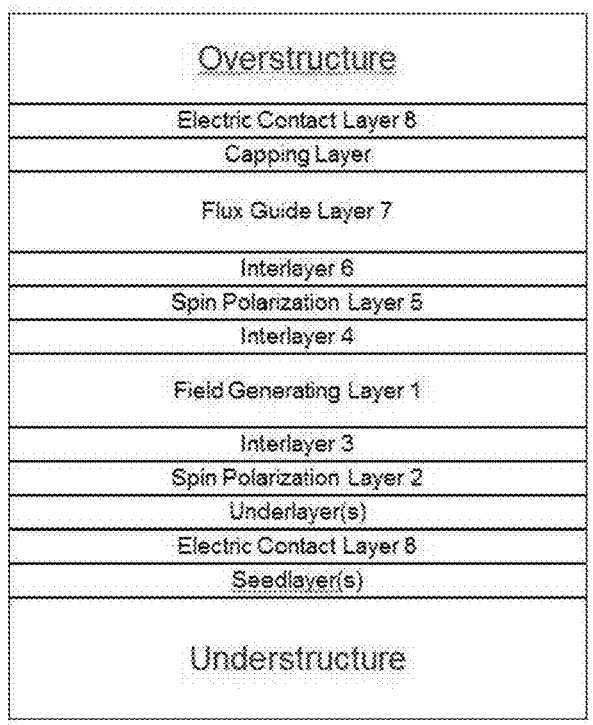
FIG. 9A and FIG. 9B show examples of practical film stacks.

The dual-side spin transfer perpendicular spin torque oscillator comprises the following thin film layers for the configuration shown in diagram 900 in FIG. 9A: a seed layer or seed layers; one or more electric contact layers 8; an underlayer or underlayers; a spin polarization layer 2 that is usually ferromagnetic; an interlayer 3 that is usually non-magnetic; a field-generating layer 1 (e.g., an oscillating layer) that is ferromagnetic and of relatively high saturation magnetization; an interlayer 4 that is usually non-magnetic; an anti-parallel coupled tri-layer having two ferromagnetic layers 5, 7 sandwiching a metal layer 6 in which the two ferromagnetic layers have distinctively different total magnetic moments, and each of the two magnetic layers could have perpendicular (to the film layer plane) anisotropy, which is not necessarily required, and the layer having the smaller magnetic moment is adjacent to the interlayer 4 interfacing with the field-generating layer 7; and a capping layer.

Figure 9B:
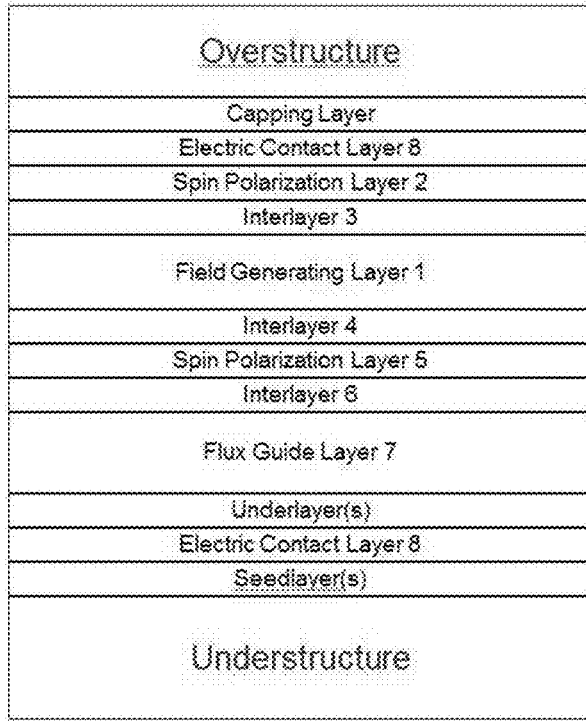

The dual-side spin transfer spin torque oscillator comprises the following thin film layers for the configuration shown in diagram 910 in FIG. 9B: one or more seed layers; an electric contact layer 8; one or more underlayers; an anti-parallel coupled tri-layer having two ferromagnetic layers 5, 7 sandwiching a metal layer 6 in which the two ferromagnetic layers have distinctively different total magnetic moments, and each of the two magnetic layers could have perpendicular (to the film layer plane) anisotropy, which is not necessarily required, and the layer having the smaller magnetic moment is adjacent to an interlayer 4; an interlayer 4 that can be a metal layer or thin layer which is relatively insulating; a field-generating layer 1 (e.g., an oscillating layer) which is ferromagnetic and of relatively high saturation magnetization; an interlayer 3 which can be either metal or relatively insulating; a spin polarization layer 2 which is usually ferromagnetic; an electric contact layer 8, and a capping layer.

Figure 10:
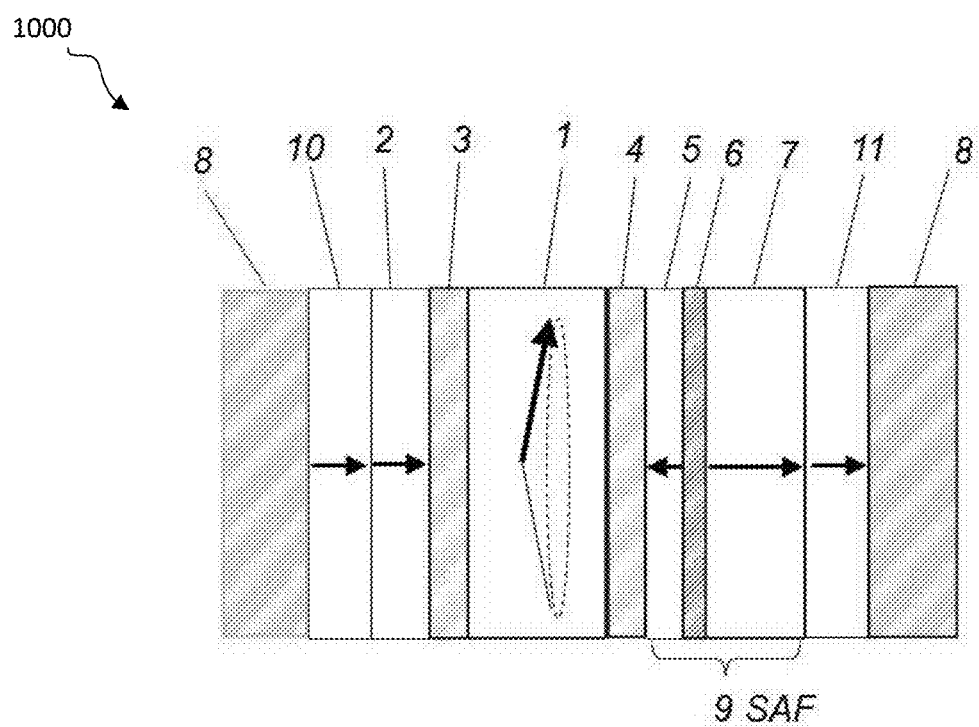
FIG. 10 shows an example schematic of the oscillation mechanism.

As shown in diagram 1000 in FIG. 10, in some implementations, the spin polarization layer 2 can contact a magnetic anisotropy layer 10 with an easy axis perpendicular to the plane of the magnetic anisotropy layer 10. In some implementations, the spin polarization layer 2 is attached to the magnetic anisotropy layer 10. In addition, a magnetic layer with significant perpendicular anisotropy 11 can contact the field-guide layer 7 of the moment-unbalanced magnetic tri-layer such that the magnetization is caused to be approximately perpendicular to the film plane spontaneously without the presence of the external magnetic field. In some implementations, the field-guide layer 7 is attached to the magnetic anisotropy layer 11. The advantage in this case is that the magnetizations of both anisotropy layers 10, 11 are in the same direction in operation.

Figure 11A:
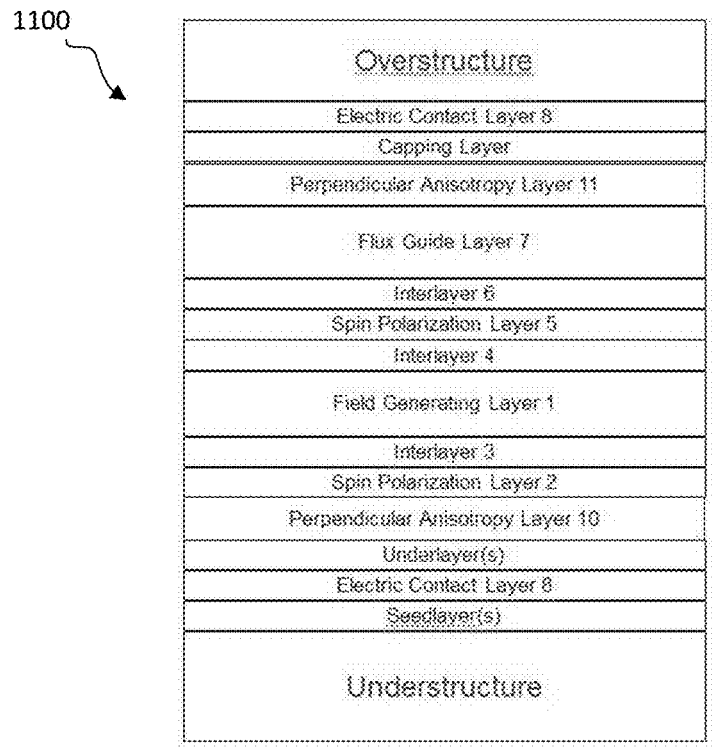
FIG. 11A and FIG. 11B show examples of practical film stacks.
Figure 11B:
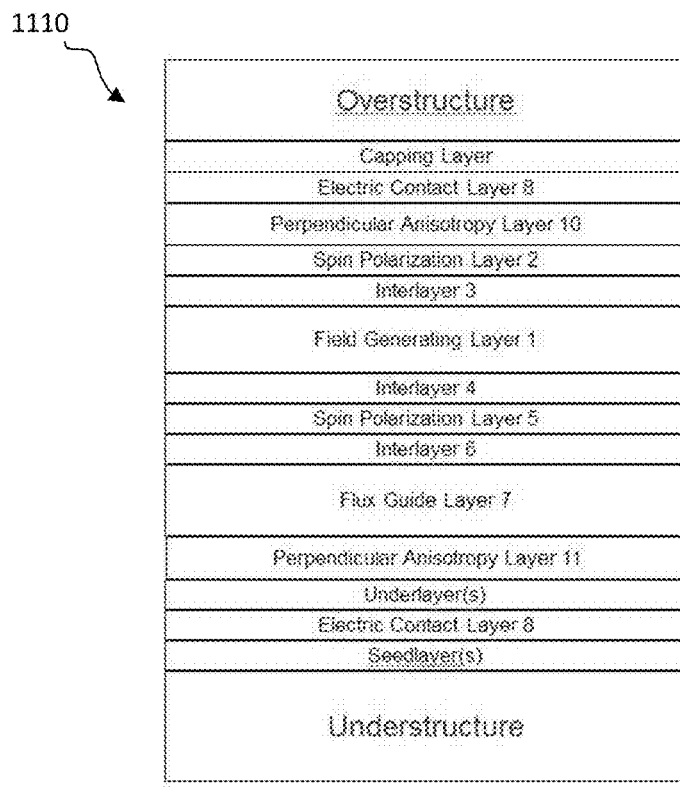

FIGS. 11A and 11B each show a practical film stack for realizing the PSTO comprising the two magnetic anisotropy layers 10, 11 having significant perpendicular anisotropy. The diagram 1100 in FIG. 11A shows a film stack analogous to diagram 900 in FIG. 9A having two anisotropic layers 10, 11. The diagram 1110 in FIG. 11B shows a film stack analogous to diagram 910 in FIG. 9B having two anisotropic layers 10, 11.

The materials of the field-generating layer 1 can be Ni, Fe, Co, or FeCo, CoNi, NiFe, FeCoB, CoFeB alloy, or Fe/Co, Co/Ni, or magnetic Heusler compounds or magnetic Heusler alloys. The field-generating layer 1 can also be a composite multilayer of magnetic materials.

The materials of the spin polarization layer 2 can be Co, Fe, Co/Pt, or magnetic Heusler alloys, or a composite multilayer of magnetic materials.

The materials of the spin polarization layer 5 in the moment-unbalanced antiparallel magnetically coupled tri-layer can be any of the following: Ni, Fe, Co, CoFe alloy, or CoFeB, or the alloy of the above materials. The spin polarization layer 5 can also be a composite magnetic multilayer of magnetic materials. The spin polarization layer 5 can be relatively thin. In some implementations, the spin polarization layer 5 thickness can be less than 5 nm.

The materials of the field-guide layer 7 in the moment-unbalanced antiparallel magnetically coupled tri-layer can comprise any of the following: Ni, Fe, Co, CoFe alloy, CoFeB alloy, Co/Ni, Co/Pt, Co/Pd multilayer. This layer can also be composite magnetic multilayer of magnetic materials.

The materials of the metal layer 6 in the moment-unbalanced antiparallel magnetically coupled tri-layer can comprise Rh, Ru, Cu, Cr, or Ir. The metal layer 6 thickness can be below 2 nm. In some implementations, the thickness of the metal layer 6 can be optimized to achieve the maximum antiparallel coupling strength between the magnetic moments of the spin-polarization layer 5 and the field-guide layer 7.

A thin dusting of elements that causes conduction spin of the electrons to randomly flip can be deposited at the interface between the metal layer 6 and the field-guide layer 7. Such dusting can cause spin mixing of the electrons in the current such that the polarization effect of the electrons passing through the spin polarization layer 5 is enhanced. The dusting elements can comprise Mn, Cr, Ir, Rh, Pt, or Mg.

The material for the magnetic anisotropy layer 10 and the magnetic anisotropy layer 11 can comprise Co/Ni, Co/Pt, Co/Pd, or Co/Cu multilayer, or FePt, MnAl, $L1_0$ ordered magnetic structure.

Although the oscillation mechanism is illustrated and described herein with reference to specific implementations, the oscillation mechanism is not intended to be limited to the details shown. Rather, various modifications can be made to the oscillation mechanism without changing the operation or functional structure of the oscillation mechanism.

Figure 12:
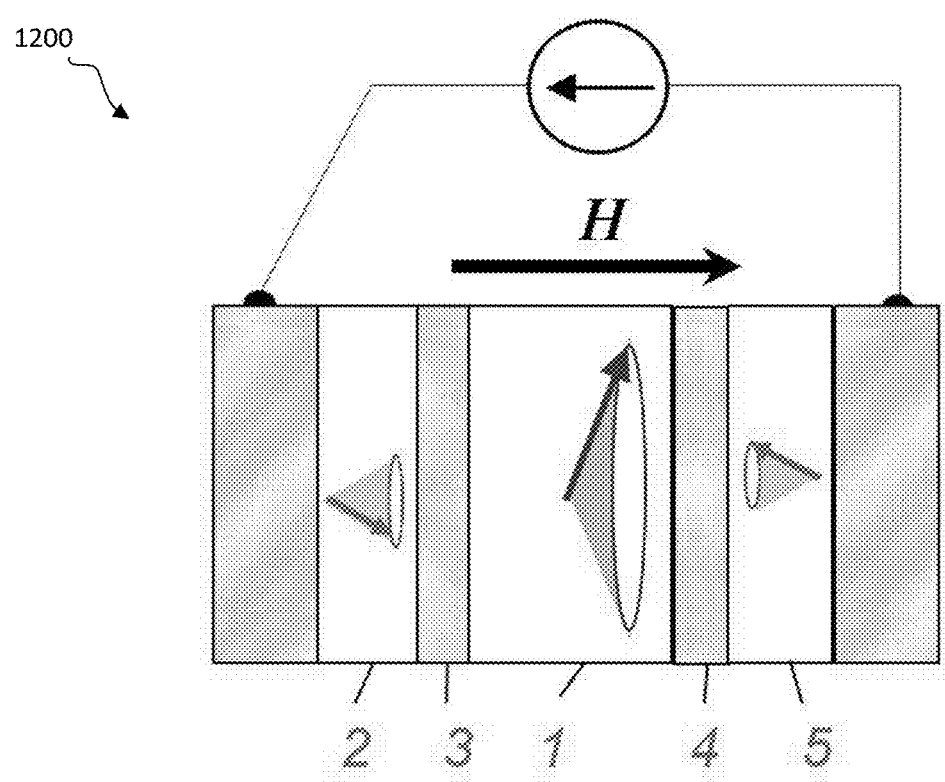
FIG. 12 shows an example schematic of the oscillation mechanism.

Referring to FIG. 12, diagram 1200 shows an example of a simplified design of the dual-side spin transfer spin torque oscillator. In this example, the spin polarization layer 5 is a stand-alone single magnetic layer rather than a part of antiparallel coupled magnetic tri-layer or SAF (synthetic anti-ferromagnet), such as the spin polarization layer 5 described in previous sections. The rest of the structure is the same as the oscillation mechanism described above in reference to FIG. 1.

Figure 13:
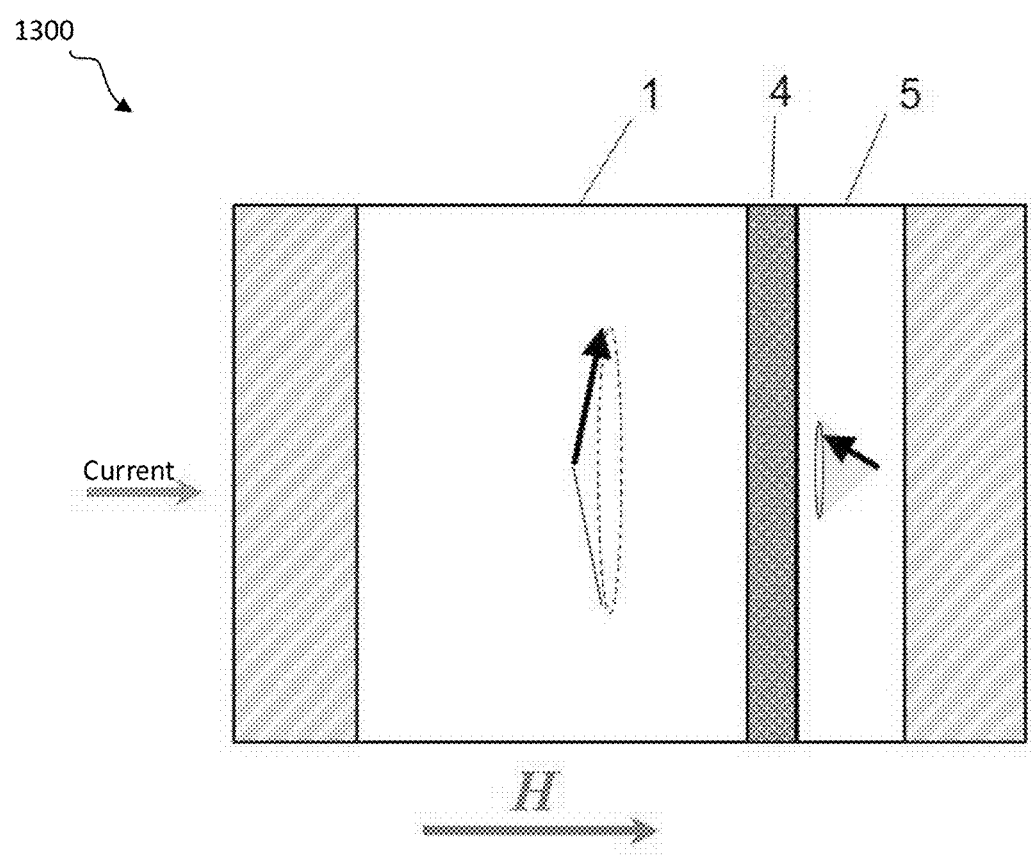
FIG. 13 shows an illustration of the oscillation mechanism.

In diagram 1300 of FIG. 13, an example illustration of the oscillation mechanism is shown. The stand-alone spin polarization layer 5 (as differentiated from the spin polarization layer 5 being a part of antiparallel coupled tri-layer) can have magnetization tilted away from the field direction that is required to produce the spin transfer effect for assisting the oscillation in the field-generating layer. This is because, as illustrated in diagram 1300 in FIG. 13, at sufficient current density, the conduction electrons in the spin polarization layer 5 are spin-polarized having a net spin orientation in a direction antiparallel to the magnetization direction of the field-generating layer 1. The conduction electrons in the field-generating layer 1 are also spin-polarized having a net spin orientation in a direction parallel to the magnetization of the spin polarization layer 5. At a sufficient current density, a steady magnetization configuration at a particular moment can be the one shown in the figure having a spin torque generated by the polarized spin current balanced by a damping torque resulting from the applied field (as well as from the magnetic field from the spin polarization layers 2, 5 themselves) within both the field-generating layer 1 and the spin polarization layer 5. Such balance causes the magnetization of the field-generating layer 1 and the magnetization of spin polarization layer 5 to have a non-zero angle with respect to the direction of the total effective field within each layer, resulting in magnetization precession in both layers around the effective field. Due to symmetry, the total effective field is roughly normal to the film plane.

The simplified oscillation mechanism design example described above in relation to FIG. 12 can operate as effectively as the oscillation mechanism having an antiparallel coupled magnetic tri-layer. For example, the simplified oscillation mechanism has the spin polarization layer 5 as described in relation to FIG. 12 compared to the oscillation mechanism having the tri-layer comprising the spin polarization layer 5, the metal layer 6, and the field-guide layer 7 described in relation to FIG. 1 above.

The dual-side spin transfer spin torque oscillator design of the oscillation mechanism, both the design shown in FIG. 1 and the simplified design shown in FIG. 12, can essentially double the efficiency of the spin transfer torque as compared to a conventional spin torque oscillator having one spin polarization layer.

Figure 14:
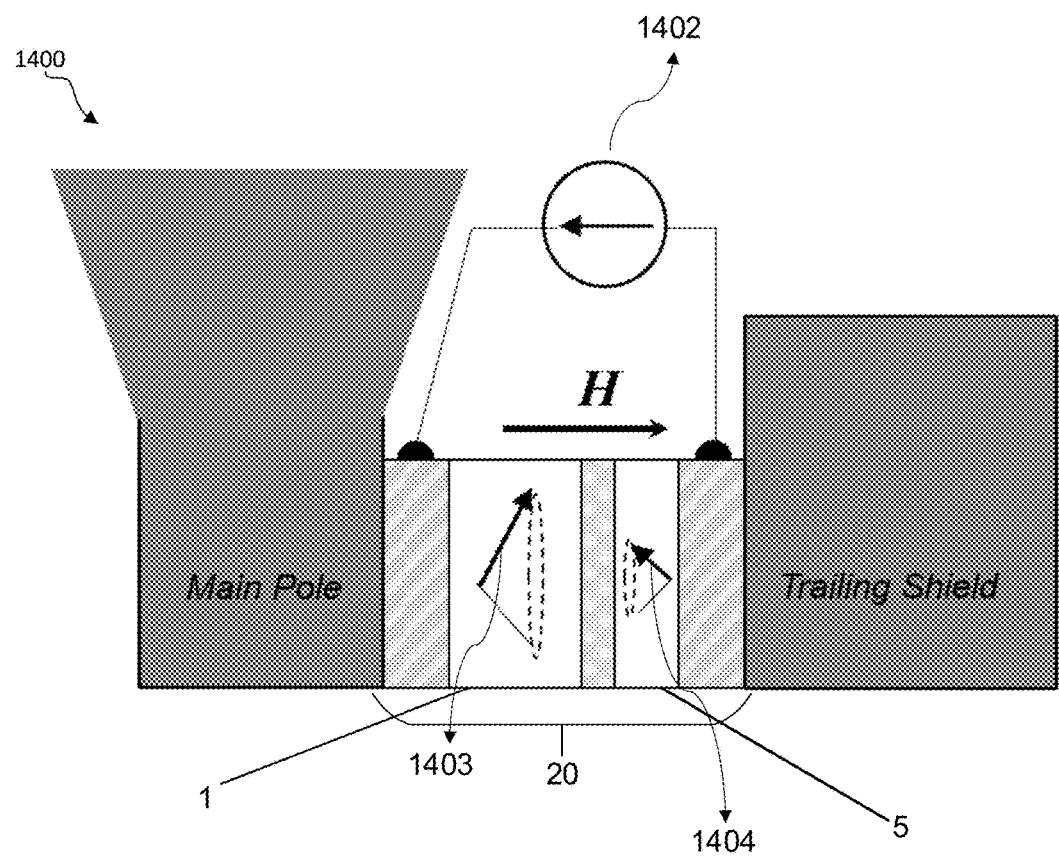
FIG. 14 shows examples of the oscillation mechanism in a recording head.

FIG. 14 shows a diagram 1400 representing an oscillation mechanism with a spin polarization layer 5. The spin polarization layer 5 has a magnetization 1404 configured to oppose the magnetization 1403 of the field-generating layer 1 during operation. The film stack is embedded in the write gap 20 of a recording head. The film stack is biased with a current source 1402. The direction of the spin transfer torque within the field-generating layer 1 is driven by the current 1402 through the film stack.

Figure 15:
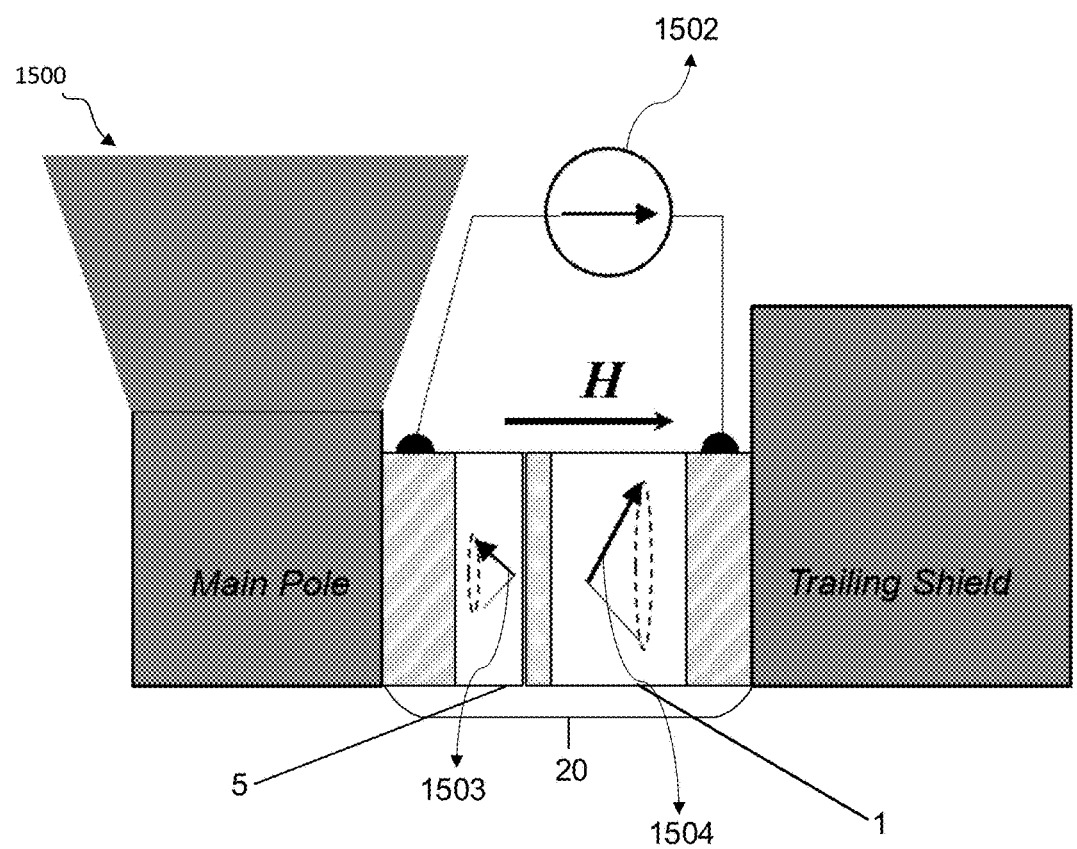
FIG. 15 shows examples of the oscillation mechanism in a recording head.

FIG. 15 shows a diagram 1500 representing an oscillation mechanism with a spin polarization layer 5. The spin polarization layer 5 has a magnetization 1503 configured to oppose the magnetization 1504 of the field-generating layer 1 during operation. The film stack is embedded in the write gap 20 of a recording head. The film stack is biased with a current source 1502. Reversing the direction of the current source 1502 (i.e. with respect to 1402) causes the direction of the spin transfer torque within the field-generating layer 1 to reverse. Such behavior can be useful during read or write operations by the recording head.

Figure 16:
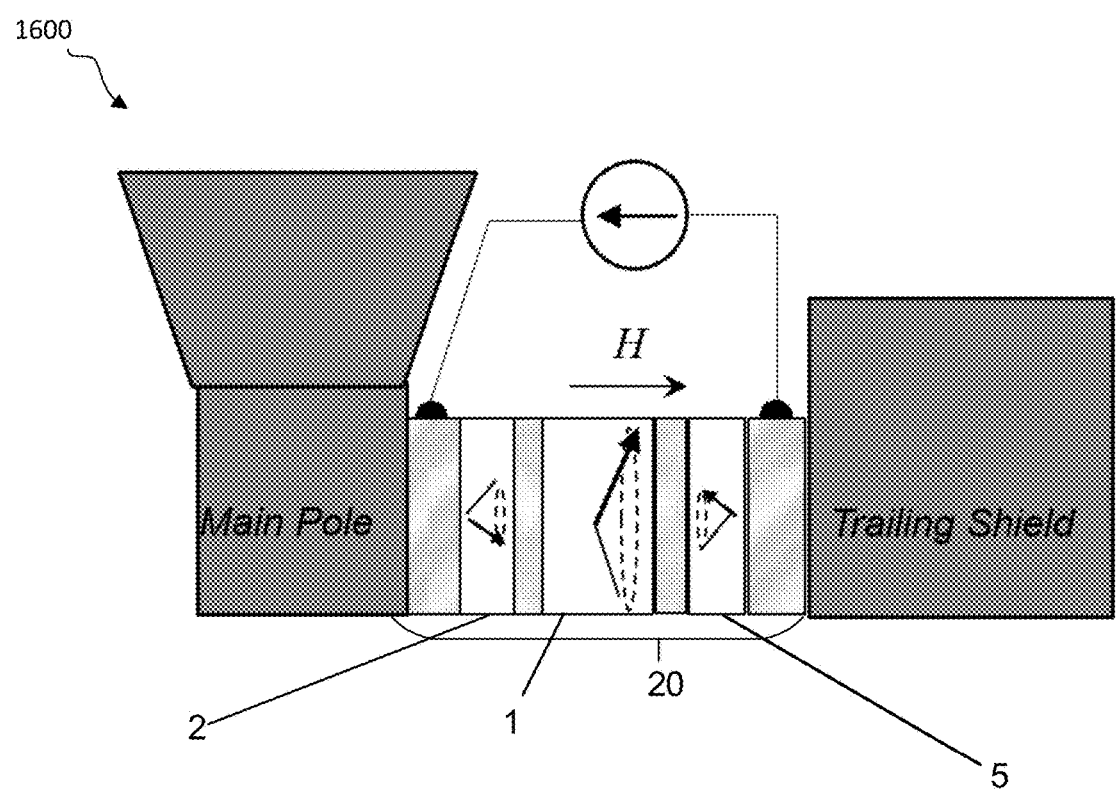
FIG. 16 shows examples of the oscillation mechanism in a recording head.

FIG. 16 shows a diagram 1600 representing an oscillation mechanism with a spin polarization layer 5 and a spin polarization layer 2. The spin polarization layer 5 has a magnetization configured to oppose the magnetization of the field-generating layer 1 during operation. The film stack is embedded in the write gap 20 of a recording head. The film stack is biased with a current.

Figure 17:
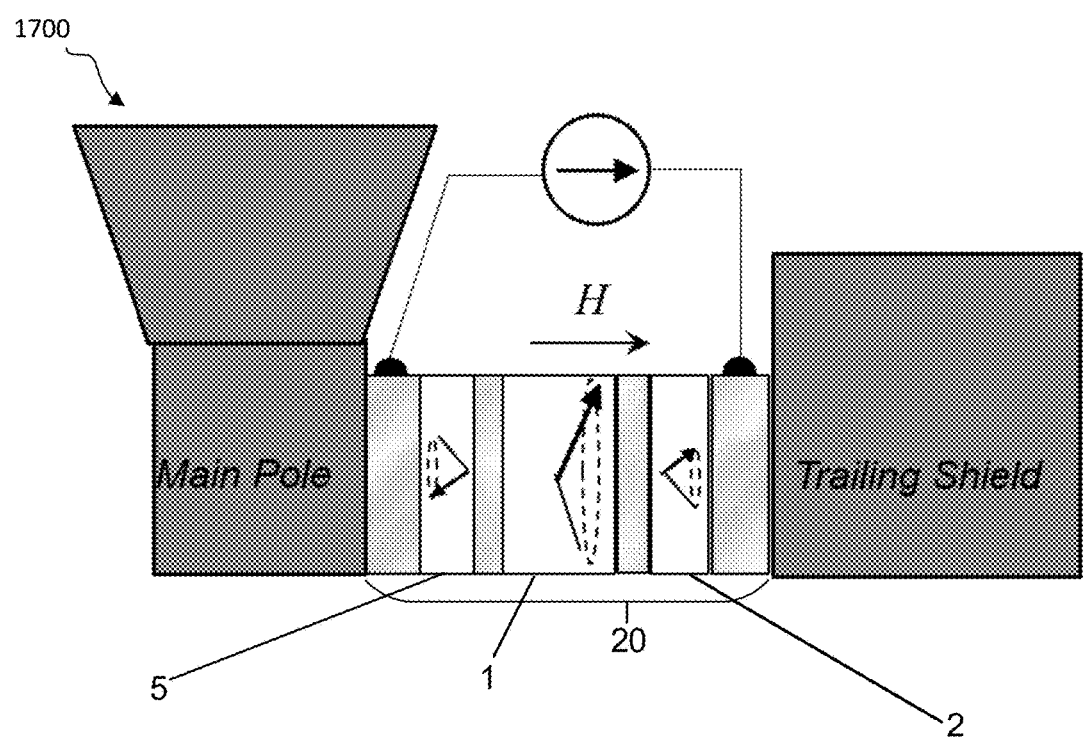
FIG. 17 shows examples of the oscillation mechanism in a recording head.

FIG. 17 shows a diagram 1700 representing an oscillation mechanism with a spin polarization layer 5 and a spin polarization layer 2. The spin polarization layer 5 has a magnetization configured to oppose the magnetization of the field-generating layer 1 during operation. The film stack is embedded in the write gap 20 of a recording head. The film stack is biased with a current. Reversing the direction of the current source causes the direction of the spin transfer torque within the field-generating layer 1 to reverse. Such behavior can be useful during read or write operations by the recording head.

A number of implementations have been described. Nevertheless, various modifications can be made without departing from the spirit and scope of the processes and techniques described herein. In addition, the processes depicted in the figures do not require the particular order shown, or sequential order, to achieve desirable results. In addition, other steps can be provided, or steps can be eliminated, from the described processes, and other components can be added to, or removed from, the describe apparatus and systems. Accordingly, other embodiments are within the scope of the following claims.

What is claimed is:

1. An oscillation mechanism comprising:
   a first spin-polarization layer having a first magnetic moment;
   a second spin-polarization layer having a second magnetic moment, wherein an orientation of the second magnetic moment is configured to oppose an orientation of the first magnetic moment;
   a field-generating layer disposed between the first spin-polarization layer and the second spin-polarization layer for generating a magnetic field that oscillates around one or more of the first and second magnetic moment orientations, the field-generating layer having a thickness that is at least twice a thickness of either the first spin-polarization layer or the second spin-polarization layer; and
   a field-guide layer comprising a fixed magnetization;
   wherein the field-guide layer, the first spin-polarization layer, and the second spin-polarization layer are configured to cause the magnetic field that oscillates around the one or more of the first and second magnetic moment orientations to be approximately uniform across the thickness of the field-generating layer.

2. The oscillation mechanism of claim 1, further comprising:
   a metal layer disposed between the second spin-polarization layer and the field-guide layer, wherein the field-guide layer and the second spin-polarization layer are magnetically coupled such that the orientation of the second magnetic moment opposes a third magnetic moment of the field-guide layer.

3. The oscillation mechanism of claim 2, wherein a magnitude of the third magnetic moment is greater than a magnitude of the second magnetic moment.

4. The oscillation mechanism of claim 2, wherein the field-guide layer and the second spin-polarization layer each have magnetic anisotropy approximately normal to a plane of that layer.

5. The oscillation mechanism of claim 1, further comprising:
   an electric contact.

6. The oscillation mechanism of claim 1, wherein the first spin-polarization layer, the second spin-polarization layer and the field-generating layer form a stack, and wherein an electric contact is on each end of the stack.

7. The oscillation mechanism of claim 5, wherein the electric contact comprises a metallic material.

8. The oscillation mechanism of claim 1, wherein the field-generating layer is configured to generate the magnetic field when a stack comprising the first spin-polarization layer, the second spin-polarization layer and the field-generating layer is biased with a current.

9. The oscillation mechanism of claim 1, wherein the field-generating layer generates the magnetic field when a stack comprising the first spin-polarization layer, the second spin-polarization layer and the field-generating layer is biased with a voltage.

10. The oscillation mechanism of claim 1, wherein a first non-magnetic interlayer is disposed between the field-generating layer and the first spin-polarization layer.

11. The oscillation mechanism of claim 10, wherein a second non-magnetic interlayer is disposed between the field-generating layer and the second spin-polarization layer.

12. The oscillation mechanism of claim 1, wherein the oscillation mechanism is formed by a lithographic patterning technique.

13. The oscillation mechanism of claim 1, further comprising:
one or more seed layers for generating one or more magnetic layers with one or more crystalline orientations.

14. The oscillation mechanism of claim 1, further comprising:
one or more underlayers.

15. The oscillation mechanism of claim 14, further comprising:
one or more seed layers for generating one or more magnetic layers with a predefined texture.

16. The oscillation mechanism of claim 2, further comprising:
a first magnetic anisotropy layer having an axis being approximately orthogonal to a plane of the first magnetic anisotropy layer, wherein the first magnetic anisotropy layer is contacting the first spin-polarization layer.

17. The oscillation mechanism of claim 16, wherein the first magnetic anisotropy layer is attached to the first spin-polarization layer.

18. The oscillation mechanism of claim 16, further comprising:
a second magnetic anisotropy layer having an axis being approximately orthogonal to a plane of the second magnetic anisotropy layer and in the same direction as the axis of the first anisotropy layer, wherein the second magnetic anisotropy layer is contacting the field-guide layer.

19. The oscillation mechanism of claim 18, wherein the second magnetic anisotropy layer is attached to the field-guide layer.

20. The oscillation mechanism of claim 2, wherein the metal layer is less than 5 nanometers thick.

21. The oscillation mechanism of claim 11, wherein each of the first and second non-magnetic interlayers comprises one or more elements configured to cause a conduction spin to rotate.

22. The oscillation mechanism of claim 1, wherein the field-generating layer has a width greater than 8 nanometers.

23. The oscillation mechanism of claim 1, wherein the orientation of the second magnetic moment is configured to be antiparallel to the orientation of the first magnetic moment.

24. A recording head for magnetic recording in a hard disk, comprising:
a write pole;
a trailing shield;
a write gap between the write pole and the trailing shield;
an oscillation mechanism in the write gap, the oscillation mechanism having a number of layers forming a stack, the stack comprising:
a first spin-polarization layer having a first magnetic moment;
a second spin-polarization layer having a second magnetic moment, wherein an orientation of the second magnetic moment opposes an orientation of the first magnetic moment;
a field-generating layer disposed between the first spin-polarization layer and the second spin-polarization layer for generating a magnetic field which oscillates around one or more of the first and second magnetic moment orientations, the field-generating layer having a thickness that is at least twice a thickness of either the first spin-polarization layer or the second spin-polarization layer; and
a field-guide layer comprising a fixed magnetization;
wherein the field-guide layer, the first spin-polarization layer, and the second spin-polarization layer are configured to cause the magnetic field that oscillates around the one or more of the first and second magnetic moment orientations to be approximately uniform across the thickness of the field-generating layer.

25. The recording head of claim 24, further comprising:
a metal layer disposed between the second spin-polarization layer and the field-guide layer, wherein the field-guide layer and the second spin-polarization layer are magnetically coupled such that the orientation of the second magnetic moment opposes a third magnetic moment of the field-guide layer.

26. The recording head of claim 24, wherein the distance between a center of the field-generating layer and a trailing edge of the write pole is within a range of approximately 5-20 nanometers.

* * * * *